United States Patent
Liu et al.

(10) Patent No.: US 7,976,821 B2
(45) Date of Patent: Jul. 12, 2011

(54) COMPOSITION AND METHOD FOR IMPROVED ALUMINUM HYDROXIDE PRODUCTION

(75) Inventors: Jianjun Liu, Aurora, IL (US); James A Counter, Thirroul (AU); Dmitri L Kouznetsov, Aurora, IL (US); David H Slinkman, Lombard, IL (US)

(73) Assignee: Nalco Company, Naperville, IL (US)

( * ) Notice: Subject to any disclaimer, the term of this patent is extended or adjusted under 35 U.S.C. 154(b) by 699 days.

(21) Appl. No.: 11/612,031

(22) Filed: Dec. 18, 2006

(65) Prior Publication Data

US 2007/0172405 A1    Jul. 26, 2007

Related U.S. Application Data

(63) Continuation-in-part of application No. 11/159,467, filed on Jun. 23, 2005, and a continuation-in-part of application No. 11/434,490, filed on May 15, 2006.

(51) Int. Cl.
*C01F 7/34* (2006.01)

(52) U.S. Cl. .......... 423/629; 423/111; 423/127
(58) Field of Classification Search .......... 423/629, 423/111, 119, 120, 121, 122, 127
See application file for complete search history.

(56) References Cited

U.S. PATENT DOCUMENTS

| 4,737,352 | A | * | 4/1988 | Owen et al. | 423/122 |
| 6,168,767 | B1 | * | 1/2001 | Welton et al. | 423/122 |

* cited by examiner

*Primary Examiner* — Stanley Silverman
*Assistant Examiner* — James A Fiorito
(74) *Attorney, Agent, or Firm* — Joshua D. Bishop; Michael B. Martin

(57) ABSTRACT

An improved method and composition for producing aluminum hydroxide crystals from precipitation liquor, involves the addition of an emulsified crystal growth modifier comprising a $C_8$-$C_{10}$ fatty acid, precursors, salts or blends thereof. The emulsified crystal growth modifier also facilitates an upward shift in particle size distribution of aluminum hydroxide and an upward shift in oxalate ball size.

13 Claims, 1 Drawing Sheet

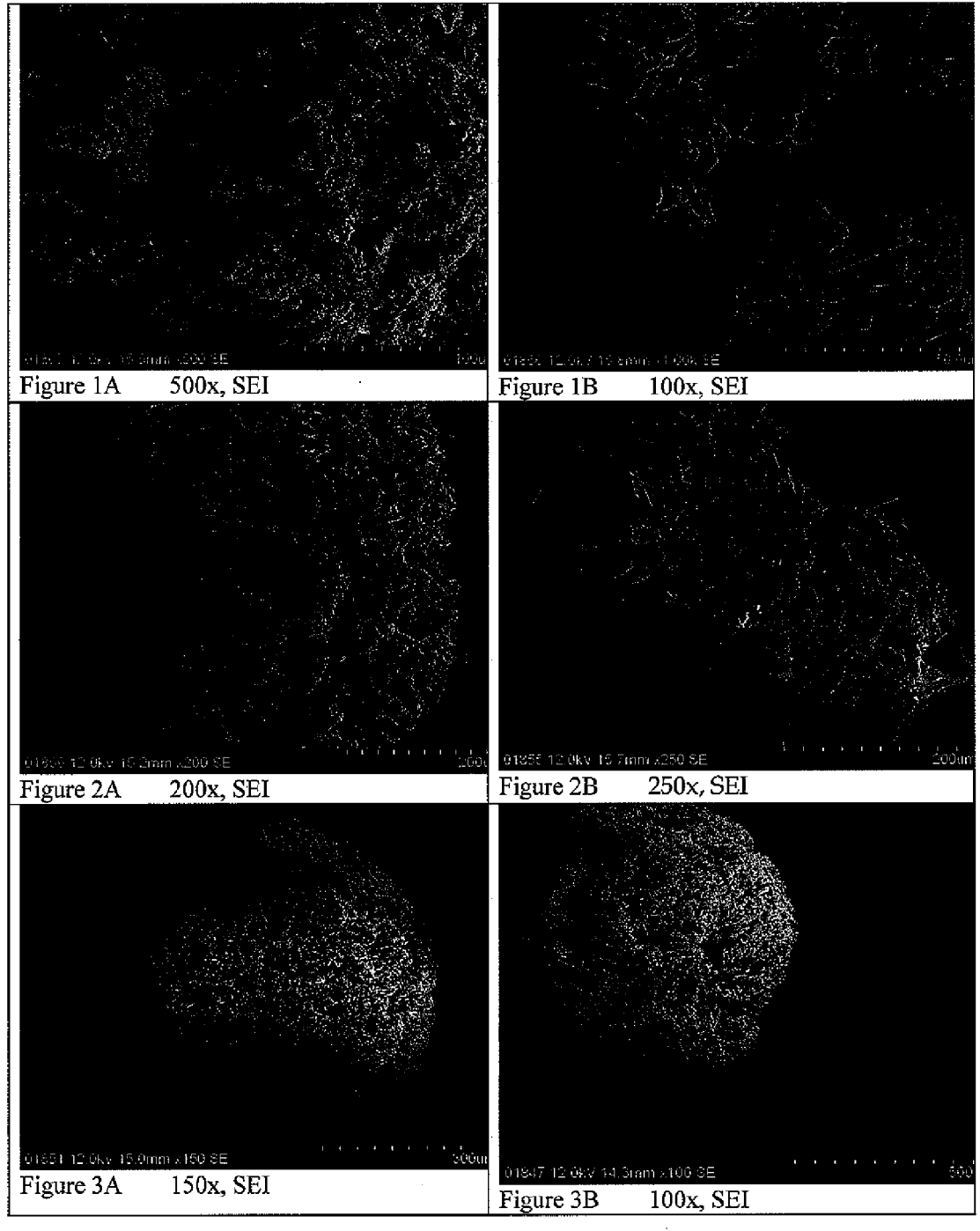

COMPOSITION AND METHOD FOR IMPROVED ALUMINUM HYDROXIDE PRODUCTION

RELATED APPLICATIONS

This application is a continuation-in-part of both U.S. application Ser. No. 11/159,467, filed Jun. 23, 2005, and U.S. application Ser. No. 11/434,490, filed May 15, 2006. Filing priority is hereby claimed and the disclosures are herein incorporated by reference.

FIELD OF THE INVENTION

The present invention relates to improved recovery of aluminum values from the Bayer process or to a precipitation liquor. In particular, the invention relates to the compositions and methods providing the increase of particle size of aluminum hydroxide product without a significant decrease in precipitation yield.

BACKGROUND OF THE INVENTION

Aluminum hydroxide is produced on an industrial scale by well-established methods, such as the Bayer Process. The process operators optimize their methods so as to produce the greatest possible yield from the aluminate process liquors while trying to achieve a given crystal size distribution of aluminum hydroxide product. It is desirable in most instances to obtain the product of relatively large crystal size since this is beneficial in subsequent processing steps required to produce aluminum metal. Production is often limited by processing conditions under which the crystallization and precipitation is conducted. These processing conditions vary from one plant to the next and include, but are not limited to, temperature profiles, seed charge, seed crystal surface area, purge of carbon dioxide or flue gases, liquor loading, liquor purity, and the like.

Extensive efforts have been invested into finding chemical additives and methods to achieve the optimal economic recovery. For example, U.S. Pat. No. 4,737,352 (hereinafter the '352 patent) assigned to Nalco discloses a method providing a reduced percent of small size crystals and an increase in the yield of coarser aluminum hydroxide crystals by adding surfactants dissolved in oil to the pregnant liquor during the precipitation phase of the process.

The limitations of yield and particle size of alumina recovered from Bayer process liquors are also disclosed in U.S. Pat. No. 6,168,767 (hereinafter the '767 patent) entitled "Production of Alumina" assigned to Ciba Specialty Chemicals Water Treatments Limited. A water-soluble crystal growth modifier formulation is disclosed comprising a first composition of a polyalkoxylated non-ionic surfactant and a second composition comprising a surfactant, or a precursor thereof, which is not polyalkoxylated. Ethylene oxide (EO) units are identified as essential components of the formulation in the polyalkoxylated non-ionic surfactant, preferably, ethylene oxide and propylene oxide (PO) units which form an ethylene oxide-propylene oxide block copolymer. The '767 patent discloses a composition which contains "substantially no mineral oil or silicone oil" and emphasizes regularly that the "advantage of the crystallization modifiers . . . is that they do not require the presence of oils." (e.g., see column 2, lines 21-25; col. 4, lines 25-35; col. 5, lines 21-33). The cost effectiveness of these components and their acceptance when compared to the surfactant/oil blends used in the majority of crystallization modifier formulations in most Bayer processing plants today remains questionable.

Also affecting the particle size and product yield parameters in alumina recovery is the presence of oxalate in the pregnant liquor. Sodium oxalate often crystallizes and precipitates from the liquor over essentially the same temperature profiles as does the desirable aluminum hydroxide product. If left undealt with, oxalate is a contaminate that can act as a seed site resulting in generation of too many small hydroxide crystals, thereby lowering average particle size of the aluminum hydroxide product. In addition, oxalate crystals may adhere to the surfaces of growing aluminum hydroxide and incorporate within the precipitated product. This further leads to the development of excessive amounts of extremely finely divided aluminum hydroxide in the aluminum hydroxide washing and calcination processes that follow. Therefore, effective removal of oxalate from the system is crucial for manufacturing of a high quality aluminum hydroxide product.

Typically, untreated precipitation liquors yield sodium oxalate crystals with needle like morphology. One of the effective ways of removing oxalate is to force it crystallize as spherical agglomerates of such needles also known as "oxalate balls." Oxalate balls co-precipitate with aluminum hydroxide product and can be removed by screening. The effectiveness of screening is higher when oxalate balls are larger in size. Still, if the balls bear in-grown aluminum hydroxide inclusions, screening may also remove useful aluminum values. Thus, the formation of oxalate balls that are larger and substantially free from incorporated aluminum values is most desirable.

Despite the continuous and ongoing development worldwide, the industry demands for economical resolution of the above-described process needs remain unfulfilled. A method of such resolution suitable for obtaining aluminum hydroxide crystals with increased particle size and yield, while facilitating oxalate removal is provided by the present invention.

SUMMARY OF THE INVENTION

The present disclosure provides for a process for recovering aluminum hydroxide crystals from a precipitation liquor comprising the steps of: (a) preparing a crystal growth modifier comprising: (1) a $C_8$ to $C_{10}$ fatty acid, precursor, salt or blends thereof, (2) an oil carrier, wherein said oil carrier content of said modifier is at least about 15% by weight, and (3) water; (b) emulsifying the crystal growth modifier; and (c) adding the emulsified crystal growth modifier to the precipitation liquor.

The present disclosure also provides for aluminum hydroxide crystals produced by a process comprising adding a crystal growth modifier to a precipitation liquor wherein the crystal growth modifier comprises one of either: (a) a surfactant fatty acid, precursor, salt or blends thereof the fatty acid having an alkyl chain length of $C_8$ to $C_{10}$ carbon atoms free of functional groups, dissolved in an oil having a boiling point above about 200° F., and emulsified in water; or (b) a surfactant fatty acid, precursor, salt or blends thereof, the fatty acid having an alkyl chain length of $C_8$ to $C_{10}$ carbon atoms, the carbon atoms free of functional groups, and emulsified in water.

The present invention farther provides for aluminum hydroxide crystals produced by a process comprising adding a crystal growth modifier to the precipitation liquor, wherein the crystal growth modifier comprises: (a) a surfactant fatty acid, precursor, salt or blends thereof, said fatty acid having an alkyl chain length of $C_8$ to $C_{10}$ carbon atoms, said carbon atoms free of functional groups; (b) an oil having a boiling point above about 200° F. in which the fatty acid is dissolved; (c) an emulsifier in an amount no greater than about 50% by weight; (d) a pH-adjuster; and (e) water in an amount within the range of from 0% to about 85% by weight.

The present invention further provides for a process for recovering aluminum hydroxide crystals from a precipitation liquor comprising the steps of: (a) preparing a crystal growth modifier comprising: (1) a $C_8$ to $C_{10}$ fatty acid, precursor, salt or blends thereof (2) an oil carrier, wherein said oil carrier content of said modifier is at least about 15% by weight, and (3) water; (b) emulsifying the crystal growth modifier; and (c) adding the emulsified crystal growth modifier to the precipitation liquor.

The present invention further provides for an emulsified crystal growth modifier comprising: a $C_8$ to $C_{10}$ fatty acid, precursor, salt or blends thereof; an oil carrier, wherein said oil carrier content of said modifier is at least about 15% by weight; and water.

The present invention further provides for a Bayer process for producing aluminum hydroxide crystals having a reduced formation of product fines concurrent with an upward shift in particle size distribution of aluminum hydroxide and an upward shift in oxalate ball size, the process comprising the addition of an emulsified crystal growth modifier to a precipitation liquor comprising: a $C_8$ to $C_{10}$ fatty acid, precursor, salt or blends thereof, an oil carrier, wherein said oil carrier content of said modifier is at least about 15% by weight; and water.

BRIEF DESCRIPTION OF THE DRAWINGS

FIG. 1. Scanning electron microscope (SEM) images of crystal products from blank tests conducted without a crystal growth modifier.
A) Fine seed, Test 1, Table 5.
B) Coarse seed, Test 2, Table 5.

FIG. 2. SEM images of crystal products from the tests conducted using Commercial Product.
A) Fine seed, Test 4, Table 5.
B) Coarse seed, Test 5, Table 5.

FIG. 3. SEM images of crystal products from the tests conducted using Composition E.
A) Fine seed, Test 7, Table 5.
B) Coarse seed, Test 8, Table 5.

DETAILED DESCRIPTION OF THE INVENTION

Definitions

The following are definitions that apply to the relevant terms as used throughout this specification.

A: Stands for aluminum concentration expressed as g/L $Al_2O_3$

C: Stands for sodium hydroxide or caustic concentration expressed as g/L $Na_2CO_3$ S: Stands for total alkali concentration expressed as g/L $Na_2CO_3$ A/C: Refers to the alumina to caustic ratio BET: Refers to the Brunauer-Emmett-Teller method for experimental determination of surface area. The method employs the analysis of adsorption isotherm of nitrogen or other gases on the material.

SEM: This acronym stands for "scanning electron microscope."

CGM: This acronym stands for "crystal growth modifier".

Commercial Product: Describes a crystal growth modifier incorporating fatty acids with chains of greater than ten carbons. The Commercial Product discussed in the Examples is available from Nalco Company, Naperville, Ill. as Nalco Product No. 7837.

Oil carrier: Describes a hydrophobic liquid that can be comprised of the aliphatic or aromatic compounds such as paraffinic oils, naphthenic oils, or fuel oils.

Also, bottoms or residual waste materials remaining from the production of alkyl alcohols represent a suitable hydrophobic liquid. The preferred waste material is the C10 alcohol distillation residue having a boiling point of about 250° C. (482° F.). It is light yellow to yellowish brown in color and has a specific gravity of about 0.862, OH— number about 90, SAP No. about 50, weight percent acetic about 0.07 and carbonyl about 0.5. Chemically, it is 57-73 weight percent of primary branched chain C10-C22 alcohols (classed as fatty alcohols) and 29-41 weight percent of mixed long chain esters and ethers (C18-C33 ester; C18-C22 ether).

The materials suitable as an oil carrier can be used neat or in a mixture of any proportion. The oil carrier needs only be a solvent for the fatty acid and have a boiling point safely above the temperature of the hot aluminate liquor undergoing precipitation (about 80° C., 176° F.).

Weight percent ratio: The total weight fraction of one reagent within 100 grams of the composition or mixture. The corresponding fraction of the other component is the latter subtracted from 100.

Percent (%) increase over control quantile particle size: The particle size distribution is conventionally given by the three quantiles, d(0.1), d(0.5) and d(0.9). Thus, 10%, 50% and 90%, respectively, of the total particle volume (or mass) is less than the size given in the tables. The percent (%) increase over the control quantile particle size is the difference between the quantiles particle sizes obtained in the tests with a CGM and control divided by the control quantile particle size.

Effective amount: An effective amount is deemed any dosage of any additive that affords an increase in one of the three quantiles when compared to an undosed control sample.

Increased product yield: Describes when a greater aluminum hydroxide solid content within the precipitating vessel at the end of the precipitation run is achieved. This is generally indicated by a lower aluminum hydroxide concentration in the liquor of the corresponding vessel.

Precipitation liquor: Refers to an aluminate containing liquor in an aluminum hydroxide precipitation step of an alumina production process. The aluminate liquor may be referred to as various terms known to those of ordinary skill in the art, for example, pregnant liquor, green liquor, and aluminum hydroxide precipitation feed.

The term precipitation liquor may also include the aluminate solution directed to decomposition in a sintering-carbonation process or combined Bayer-sintering process as accomplished by the methods well known to those skilled in the art as described, for example, in U.S. Pat. Nos. 4,256,709 and 3,642,437 and RU. Pat. Nos. 2,184,703, 2,257,347, and 2,181,695, which are herein incorporated by reference.

As described in U.S. Pat. No. 4,737,352 assigned to Nalco, the invention in practice is unaffected by different proprietary precipitation techniques involving proprietary process parameters. This is of great significance because it establishes that regardless of the proprietary processing parameters maintained inside the precipitating tank, the present invention for actual practice only requires blending and in-line injection of the proposed treatment.

Precipitation feed liquor: refers to the precipitation liquor that flows into a precipitator of an aluminum hydroxide precipitation process.

Heated precipitation liquor: Any liquor within the aluminum hydroxide production process having a free alkalinity level above 50 g/L of $Na_2CO_3$ and a temperature above ambient or 25° C.

Spent liquor: Describes the liquor resulting from the removal of precipitated aluminum values, such as the spent liquor after the final classification stage that returns back to digestion in the Bayer process.

Precipitation test procedure: Each set of tests was run using fresh pregnant liquor, obtained from the reconstitution of plant spent liquor. A desired weight of spent liquor was measured into a stainless steel beaker and the volume was reduced by evaporation to about 30%. To this a set weight of aluminum hydroxide solid was added and the mixture stirred until it was dissolved. This solution was removed from the hot plate and placed on a weighing balance and de-ionized water added until a desired weight was attained. The pregnant liquor was filtered to remove any insoluble material.

All precipitation tests were performed in 250-mL Nalgene® bottles rotated end-over-end, at 10 rpm, in an Intronics temperature-controlled water bath. The pregnant liquor having a density of 1.30 kg/L (~72° C.) was placed into the bottles by weight (200 mL=260.0 g), for improved precision. The additive was dosed, with respect to the total surface area of the seed crystals ($mg/m^2$), to the lid of the appropriate bottles using a micro-syringe and the bottles were then placed in the rotating bath for equilibration at 72° C. (20 minutes). After equilibration, the bottles were removed, quickly charged with the required quantity of seed (50 g/L, based on liquor volume) and immediately returned to the water bath. The temperature of the water bath was set to 72° C. The bottles were rotated overnight for 15 hours.

On completion of the 15 hours, the bottles were removed and for each bottle a 20-mL sample of the slurry was filtered through a syringe filter and submitted for liquor analysis. To prevent any further precipitation, 10 mL of a sodium gluconate solution (400 g/L) was added to the remaining slurry and mixed well. The solids were collected by vacuum filtration and were thoroughly washed with hot deionized water and dried at 110° C. The particle size distribution and specific surface area were determined on a Malvern Particle Sizer, which is well known in the art. The particle size distribution is conveniently given by three quantiles, d(0.1), d(0.5) and d(0.9). These represent the particle size at which the total particle volume (or mass) is less than about 10%, 50% and 90% respectively.

PREFERRED EMBODIMENTS

In one embodiment the precipitation liquor is located in the Bayer process.

The prepared crystal growth modifier in the present disclosure contains a fatty acid, an oil carrier, and water.

Prepared crystal growth modifiers of the present disclosure contain fatty acids having various forms or combination of forms. For example, the fatty acid alkyl chain can be saturated, unsaturated, branched, unbranched, substituted, or a combination thereof.

In one embodiment, said fatty acid has carbon backbone that is free of functional groups.

In one embodiment, the crystal growth modifier treatment of the present invention incorporates a C8-10 fatty acid blend. The suitable blend is available from Procter and Gamble under the trade name C-810L. This blend has an average molecular of 154 g/mol and an approximate composition of the following fatty acid chain lengths: $C_6$<6%, $C_8$ 53-60%, $C_{10}$ 34-42% and $C_{12}$<2%. Many other commercial fatty acid products are known to those skilled in the art and would work for the present invention. The proposed CGM treatment can also be is prepared as a 150 g/L solution of the fatty acid blend in a paraffinic oil carrier. Appropriate paraffinic oil is available from Exxon Mobil Corporation under the trade name Escaid 110.

Prepared crystal growth modifiers of the present disclosure may contain various amounts of oil carrier content.

In one embodiment, the oil carrier content of said crystal growth modifier is from about 15% to about 85% by weight.

In another embodiment, the oil carrier content of said crystal growth modifier is from about 20% to about 50% by weight.

In another embodiment, the oil carrier content of said crystal growth modifier is from about 15% to about 99% by weight.

Prepared crystal growth modifiers of the present disclosure may contain various amounts of water content.

In one embodiment, the water content of the crystal growth modifier is in the range of from about 30% to about 60% by weight.

The prepared crystal growth modifier is emulsified prior to its addition to the precipitation liquor. The crystal growth modifier may be prepared as a water-in-oil or oil-in-water emulsion. There are various mechanisms for emulsifying these three components, which are known to those of ordinary skill in the art. For example, an emulsion can be created by a mechanical stimulus, such as agitation, a chemical stimulus, such as by pH change of a mixture, or a combination thereof.

Crystal growth modifiers prepared as microemulsions are a preferred form of addition to the precipitation liquor. Microemulsions are significantly different in structure from regular emulsions. Regular emulsions are comprised of separate oil droplets in water or water droplets in oil with a sharp transition between the two phases. Microemulsions have a particle size in the range from 10 to 600 nm, so that they appear as clear or opalescent one-phase formulations.

Unlike regular emulsions, microemulsions are thermodynamically stable. This means that microemulsions form spontaneously when the components are brought together and stay stable as long as the components are intact. Thus, their manufacturing may be reduced to simple kneading without the need for expensive high energy mixing. Also, microemulsions are not prone to separation or settling, which results in their long storage stability. Only gentle mixing is required to restore microemulsions upon their freezing or high temperature exposure.

The emulsified crystal growth modifier may be introduced into the precipitation liquor via various routes. In one embodiment, the emulsified crystal growth modifier is added to the precipitation liquor at the following steps of a Bayer process: a) to a precipitation feed liquor, b) to a seed slurry, c) directly into a precipitation tank, and d) a combination thereof.

The emulsified crystal growth modifier can be added to the precipitation liquor via various modes of addition. In-line injection of the emulsified crystal growth modifier is one mode of addition.

The amount of crystal growth modifier required to produce desirable effect depends upon the precipitation process parameters. Most often, this amount is determined by the surface area of available hydrated alumina solids in the precipitation liquor. The solids comprise the aluminum hydroxide introduced as seed or originated as new crystals or agglomerates during the decomposition of precipitation liquor. The suitable amount of crystal growth modifier can range from about 0.01 to about 30 mg per square meter of the available aluminum hydroxide seed area, and preferably, from about 0.1 to about 15 mg per square meter. Commonly, less than about 8 mg/m$^2$ of CGM can be used.

In case the available aluminum hydroxide area may not be reliably determined, the precipitation operators can dose the crystal growth modifier by the volume. In this case, the crystal growth modifier amount may range from about 0.01 to about 400 mg/liter of precipitation liquor, preferably from about 0.05 to about 200 mg/liter of precipitation liquor. Commonly less than about 100 mg/liter of CGM can be used.

The addition of the crystal growth modifier product to the precipitation liquor reduces the percent of alumina trihydrate crystal fines formed in the Bayer process substantially without any decrease in the overall product yield and thereby increases the yield of alumina trihydrate crystals of optimal particle size for aluminum metal production. An upward shift in oxalate ball size also occurs.

In one embodiment, the addition of emulsified crystal growth modifier results in at least half of the recovered crystals by weight exceed 325 mesh (44-45 microns).

In another embodiment, the oxalate balls precipitate to a size in the range of from about 200 to about 10,000 μm.

In another embodiment, the oxalate balls precipitate to a size in the range of about 300 μm.

The addition of crystal growth modifier also provides a more effective Bayer process wherein the yield of coarser alumina trihydrate particles is increased, and the separation and collection of alumina trihydrate from the alkaline liquor is improved.

The oxalate balls and said aluminum hydroxide crystals may be separated by various separation techniques.

In one embodiment, the separation occurs with a separation method containing one or more screens.

In another embodiment, the separation occurs with a separation method containing one or more cyclones.

The examples below are offered to aid in understanding the present invention and are not to be construed as limiting the scope thereof.

Example 1

The following tests were conducted to support the contention that among the series of crystal growth compositions employing linear fatty acids the optimal performance is achieved for those employing the acids in the C8-C10 range of chain lengths. The tests used the precipitation procedure as described above.

The fatty acids of higher than 98% purity with a linear chain in the range from C4 to C18 were purchased from Sigma-Aldrich Corporation (www.aldrich.com). The fatty acids included butanoic, hexanoic, octanoic, decanoic, tetradecanoic, and octadecanonic.

The green liquor with A/C ratio=0.66~0.70 was reconstituted from the spent liquor of a North American alumina plant. The precipitation temperature was 72° C., holding time 15 hours, and seed charge 50 g/L. The seed was the C31 alumina trihydrate with BET specific surface area of 0.38 m$^2$/g.

The crystal compositions were prepared as 15% solutions of individual fatty acids in 85% paraffinic solvent available from Exxon Mobil Corporation under the trade name Escaid 110. The crystal growth modifier compositions were tested at the equal dose of 3 mg per square meter of seed surface (60 ppm vs. green liquor).

The results shown in Table 1 indicate that the fatty acid chain length has a significant impact on the coarsening of the precipitated product. The increase of the carbon chain length results in a sharp increase of the product particle size for C8 and C10 fatty acids followed by a gradual decrease thereafter. This effect is more pronounced for smaller particles as represented by the d(0.1) quantile. Similar effect would be observed if the presence of smaller particles would be measured by another such characteristic used by the industry such as the percent reduction to a—325 mesh fraction (equivalent to 44-45 microns).

TABLE 1

Effect of the Fatty Acid Chain Length on the Precipitate Granulometry.

| Chain | Dose (mg/m$^2$) | Quantile Particle Size, μm | | | % Increase Over Control Quantile Particle Size | | |
|---|---|---|---|---|---|---|---|
| | | d(0.1) | d(0.5) | d(0.9) | d(0.1) | d(0.5) | d(0.9) |
| Control 1 | — | 42.7 | 69.3 | 111.1 | | | |
| Control 2 | — | 42.9 | 69.5 | 111.3 | | | |
| Average | | 42.8 | 69.4 | 111.2 | | | |
| Butanoic (C4) | 3 | 43.1 | 69.6 | 111.0 | | | |
| Butanoic (C4) | 3 | 43.0 | 69.5 | 111.2 | | | |
| Average | | 43.0 | 69.5 | 111.1 | 0.5 | 0.1 | 0 |
| Hexanoic (C6) | 3 | 43.2 | 69.9 | 112.0 | | | |
| Hexanoic (C6) | 3 | 43.3 | 70.0 | 112.1 | | | |
| Average | | 43.2 | 70.0 | 112.1 | 0.9 | 0.9 | 0 |
| Octanoic (C8) | 3 | 44.3 | 71.7 | 114.6 | | | |
| Octanoic (C8) | 3 | 44.8 | 72.4 | 115.7 | | | |
| Average | | 44.5 | 72.0 | 115.2 | 4.0 | 3.8 | 3.6 |
| Decanoic (C10) | 3 | 44.3 | 74.9 | 124.8 | | | |
| Decanoic (C10) | 3 | 44.9 | 74.1 | 123.3 | | | |
| Average | | 44.6 | 74.5 | 124.1 | 4.2 | 7.2 | 11.6 |
| Tetradecanoic (C14) | 3 | 43.4 | 73.4 | 122.0 | | | |
| Tetradecanoic (C14) | 3 | 43.5 | 73.6 | 122.6 | | | |
| Average | | 43.5 | 73.5 | 122.3 | 1.6 | 5.9 | 9.9 |
| Octadecanoic (C18) | 3 | 42.6 | 71.8 | 119.1 | | | |
| Octadecanoic (C18) | 3 | 42.7 | 72.1 | 120.2 | | | |
| Average | | 42.6 | 72.0 | 119.7 | -0.5 | 3.7 | 7.6 |

Example 2

The following results demonstrate that crystal growth modifier compositions prepared as microemulsions provide the performance equivalent to that of waterless compositions.

The crystal growth modifier compositions below were tested under the same conditions as in the previous example.

Composition A (Waterless Solution):

15% C8-10 fatty acid blend available from Proctor and Gamble Chemicals under the trade name C-810L, 85% paraffinic oil available from Exxon Mobil Corporation under the trade name Escaid 110, Composition B (Microemulsion):

15% C8-10 fatty acid blend available from Proctor and Gamble Chemicals under the trade name C-810L, 30% paraffinic oil available from Exxon Mobil Corporation under the trade name Escaid 110, 5% ethoxylated C10-16 alcohol emulsifier, and 45% water.

Table 2 demonstrates that the coarsening effect of Composition B is similar to that of the Composition A for all the three quantile particle sizes listed.

TABLE 2

Coarsening Effect of CGM Compositions Formulated as Hydrocarbon Solutions and Water Emulsions Compared.

| Example | CGM Dose (mg/m²) | Quantile Particle Size, μm | | | % Increase in Mean of Control Quantile Particle Size | | |
|---|---|---|---|---|---|---|---|
| | | D(0.1) | d(0.5) | d(0.9) | d(0.1) | d(0.5) | d(0.9) |
| Control 1 | — | 43 | 70 | 111 | | | |
| Control 2 | — | 44 | 70 | 112 | | | |
| Average | — | 43 | 70 | 112 | | | |
| Composition A | 3 | 47 | 75 | 119 | | | |
| Composition A | 3 | 48 | 76 | 120 | | | |
| Average | 3 | 47 | 76 | 120 | 8 | 8 | 7 |
| Composition B | 3 | 46 | 75 | 119 | | | |
| Composition B | 3 | 47 | 75 | 120 | | | |
| Average | 3 | 47 | 75 | 120 | 8 | 7 | 7 |

Example 3

The following tests were conducted to compare the performance of the emulsion compositions to that of Commercial Product.

Again, the test conditions were the same as previously, except for the compositions were tested at three different dosages.

Composition C:
- 15% C8-10 fatty acid blend available from Proctor and Gamble Chemicals under the trade name C-810L,
- 30% C10 alcohol distillation residue available from Nalco Company under the trade name NALCO 99DA115,
- 15% ethoxylated propoxylated C14-C18 alcohol emulsifier available from Nalco Company under the trade name NALCO 60096,
- 20% potassium hydroxide solution (50%)
- 20% water Composition D:
- 15% C8-10 fatty acid blend available from Proctor and Gamble Chemicals under the trade name C-810L,
- 20% C10 alcohol distillation residue available from Nalco Company under the trade name NALCO 99DA115,
- 25% ethoxylated propoxylated C14-C18 alcohol emulsifier available from Nalco Company under the trade name NALCO 60096, and
- 18% potassium hydroxide solution (50%)
- 22% water.

Table 3 shows that the emulsions represented by Compositions C, and D provide the coarsening performance equal or exceeding that of Commercial Product at every corresponding dosage level in each of the three quantiles listed.

TABLE 3

Coarsening Effect of Commercial Product and CGM Emulsions Compared.

| Example | CGM Dose, mg/m² | Quantile Particle Size, μm | | | % Increase Over Control Quantile Particle Size | | |
|---|---|---|---|---|---|---|---|
| | | d(0.1) | d(0.5) | d(0.9) | D(0.1) | D(0.5) | d(0.9) |
| Control 1 | — | 40.8 | 65.3 | 103.9 | | | |
| Control 2 | — | 41.3 | 66.2 | 105.1 | | | |
| Average | — | 41.1 | 65.8 | 104.5 | | | |
| Commercial Product | 1 | 42.8 | 68.6 | 108.0 | 4 | 4 | 3 |
| Commercial Product | 3 | 44.2 | 70.2 | 111.0 | 8 | 7 | 6 |
| Commercial Product | 5 | 45.3 | 71.8 | 113.3 | 10 | 9 | 8 |
| Composition C | 1 | 42.9 | 68.4 | 108.6 | 4 | 4 | 3 |
| Composition C | 3 | 44.2 | 70.1 | 110.7 | 8 | 7 | 6 |
| Composition C | 5 | 45.1 | 71.9 | 113.3 | 10 | 9 | 8 |
| Composition D | 1 | 43.1 | 68.6 | 109.2 | 5 | 5 | 4 |
| Composition D | 3 | 44.9 | 71.4 | 111.5 | 9 | 8 | 7 |
| Composition D | 5 | 45.9 | 72.5 | 114.4 | 12 | 10 | 9 |

Example 4

In addition to increasing the particle size of aluminum hydroxide product, the improved crystal growth modifier compositions help sodium oxalate crystallize into larger balls that are substantially free of aluminum hydroxide inclusions. Formation of larger balls facilitates the removal of oxalate from the process liquor while the purity of the balls prevents the loss of desirable aluminum values.

The following tests were conducted comparing the oxalate crystallization performance of an improved Composition E prepared from 15% C-810L fatty acid and 85% C10 alcohol distillation residue versus Commercial Product.

The tests were conducted using the liquor containing: A 153.6 g/L, C 220.2 g/L, S 266.9 g/L, A/C 0.698.

The tests used aluminum hydroxide seed of coarse and fine sizes procured from a North American alumina plant as well as the C31 seed as listed in Table 4.

TABLE 4

Size Parameters of Seed Samples.

| Seed | D(0.1), μm | d(0.5), μm | d(0.9), μm | B.E.T. specific area, m²/g |
|---|---|---|---|---|
| C31 | 4.2 | 33.5 | 79.0 | 0.0380 |
| Plant Coarse | 50.3 | 89.0 | 149.8 | 0.0867 |
| Plant Fine | 27.06 | 65.15 | 121.7 | 0.1570 |

The initial spent liquor from the plant contained 3.2 g/L sodium oxalate. For a better comparison, this liquor was additionally spiked with 0.5 g/L sodium oxalate to reach the total sodium oxalate concentration of 3.7 g/L in the test liquor at the beginning of the tests. The sodium oxalate concentrations in the test liquor before and after the test are listed in TABLE 5.

The results in TABLE 5 indicate that both crystal growth modifier compositions greatly improved oxalate ball formation. The oxalate balls formed in the presence of Composition E were significantly larger and cleaner from aluminum hydroxide than those formed in the presence of Commercial Product.

TABLE 5

Effect of Composition E and Commercial Product on Oxalate Precipitation.

| Test No | CGM Composition | CGM Dose, mg/m2 (ppm) | Seed Type | Seed Charge, g/L | [NaOX] in liquor Before the test, g/L | [NaOX] in liquor After the test, g/L | Δ[NaOX] (Before − After) g/L | Oxalate Ball Size |
|---|---|---|---|---|---|---|---|---|
| 1 | Control | 0 (0) | Plant Fine | 100 | 3.7 | 2.1 | 1.6 | None |
| 2 | Control | 0 (0) | Plant Coarse | 150 | 3.7 | 2.2 | 1.5 | None |
| 3 | Commercial Product | 3.0 (60) | C31 | 50 | 3.7 | 2.1 | 1.6 | <200 μm |
| 4 | Commercial Product | 3.8 (60) | Plant Fine | 100 | 3.7 | 2.2 | 1.5 | <200 μm |
| 5 | Commercial Product | 4.6 (60) | Plant Coarse | 150 | 3.7 | 2.0 | 1.7 | <200 μm |
| 6 | Composition E | 3.0 (60) | C31 | 50 | 3.7 | 2.3 | 1.4 | <500 μm |
| 7 | Composition E | 3.8 (60) | Plant Fine | 100 | 3.7 | 2.5 | 1.2 | <500 μm |
| 8 | Composition E | 4.6 (60) | Plant Coarse | 150 | 3.7 | 2.4 | 1.3 | <500 μm |

The SEM images of the precipitates are shown in FIGS. 1-3. In the blank test without crystal growth modifier) sodium oxalate precipitated in the form of needles incorporated into the alumina trihydrate for both fine and coarse seed charges as shown in FIG. 1. Commercial Product caused formation of sodium oxalate agglomerates sized up to 200 μm having small inclusions of aluminum hydroxide as shown in FIG. 2. In the presence of Composition E, sodium oxalate balls up to 500 μm precipitated with much less aluminum hydroxide inclusions as observed in FIG. 3. Thus, the use of Composition E may result in lower losses of aluminum values during the removal of sodium oxalate agglomerates.

Although the invention has been described in detail in the foregoing for the purpose of illustration, it is to be understood that such detail is solely for that purpose and that variations can be made therein by those skilled in the art without departing from the spirit and scope of the invention except as except as it may be limited by the claims.

What is claimed is:

1. A process for recovering aluminum hydroxide crystals from a precipitation liquor comprising the steps of: (a) preparing a crystal growth modifier comprising: (1) a $C_8$ to $C_{10}$ fatty acid, precursor, salt or blends thereof and said carbon atoms free of functional groups, (2) an oil carrier, wherein said oil carrier content of said crystal growth modifier is greater than 15% by weight, and (3) water; (b) emulsifying the crystal growth modifier; and (c) adding the emulsified crystal growth modifier to the precipitation liquor;
wherein the crystal growth modifier excludes polyalkoxylated non-ionic surfactant.

2. The process of claim 1 wherein said precipitation liquor is located in a Bayer process.

3. The process of claim 2 wherein said addition of emulsified crystal growth modifier results in that at least half of the recovered crystals by weight exceed 325 mesh.

4. The process of claim 2, wherein said fatty acid has carbon backbone that is free of functional groups.

5. The process of claim 2 wherein the oil carrier content of said crystal growth modifier is from greater than 15% to about 85% by weight.

6. The process of claim 2 wherein the oil carrier content of said crystal growth modifier is from about 20% to about 50% by weight.

7. The process of claim 2 wherein the oil carrier content of said crystal growth modifier is from greater than 15% to about 99% by weight.

8. The process of claim 2, wherein said crystal growth modifier is added through mixing into a precipitation liquor at the following steps of said Bayer process: a) to a precipitation feed liquor, b) to a seed slurry, and c) directly into a precipitation tank; and d) a combination of steps a through c.

9. The process of claim 2, wherein the water content of the crystal growth modifier is in the range of from about 30% to about 60% by weight.

10. Aluminum hydroxide crystals produced by a process comprising adding a crystal growth modifier to a precipitation liquor, wherein the crystal growth modifier comprises: (a) a surfactant fatty acid, precursor, salt or blends thereof, the fatty acid having an alkyl chain length of $C_8$ to $C_{10}$ carbon atoms free of functional groups, dissolved in an oil having a boiling point above about 200° F. wherein an oil content of said crystal growth modifier is greater than 15% by weight, and emulsified in water; or wherein the crystal growth modifier consists essentially of (b) a surfactant fatty acid, precursor, salt or blends thereof, the fatty acid having an alkyl chain length of $C_8$ to $C_{10}$ carbon atoms, the carbon atoms free of functional groups, and emulsified in water;
wherein the crystal growth modifier excludes polyalkoxylated non-ionic surfactant.

11. Aluminum hydroxide crystals produced by a process comprising adding a crystal growth modifier to a precipitation liquor, wherein the crystal growth modifier comprises: (a) a surfactant fatty acid, precursor, salt or blends thereof, said fatty acid having an alkyl chain length of $C_8$ to $C_{10}$ carbon atoms, said carbon atoms free of functional groups; (b) an oil having a boiling point above about 200° F. in which the fatty acid is dissolved wherein an oil content of said crystal growth modifier is greater than 15% by weight; (c) an emulsifier in an amount no greater than about 50% by weight; (d) a pH-adjuster; and (e) water in an amount within the range of from 0% to about 85% by weight;
wherein the crystal growth modifier excludes polyalkoxylated non-ionic surfactant.

12. The aluminum hydroxide crystals of claim 11 wherein said precipitation liquor is in a Bayer process.

13. The process of claim 2, wherein the emulsified crystal growth modifier is a microemulsion.

* * * * *